United States Patent
Kallio

(10) Patent No.: US 9,491,305 B2
(45) Date of Patent: Nov. 8, 2016

(54) CALL MANAGEMENT ADJUSTMENT IN CALL CONTINUITY ARCHITECTURE

(75) Inventor: Juha Kallio, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 1727 days.

(21) Appl. No.: 11/477,767

(22) Filed: Jun. 30, 2006

(65) Prior Publication Data

US 2008/0004007 A1   Jan. 3, 2008

(30) Foreign Application Priority Data

Jan. 30, 2006 (EP) ..................................... 06101042

(51) Int. Cl.
| | |
|---|---|
| H04W 4/00 | (2009.01) |
| H04M 7/12 | (2006.01) |
| H04M 3/42 | (2006.01) |
| H04L 29/06 | (2006.01) |
| H04W 8/18 | (2009.01) |

(52) U.S. Cl.
CPC .......... *H04M 7/123* (2013.01); *H04L 65/1016* (2013.01); *H04L 65/1083* (2013.01); *H04M 3/42153* (2013.01); *H04W 8/18* (2013.01)

(58) Field of Classification Search
CPC ....... H04W 24/00; H04W 4/00; H04W 4/08; H04W 4/10; H04W 4/12; H04W 68/00; H04W 76/005; H04W 88/14; H04W 8/18; H04W 8/186; H04W 4/003; H04W 88/18; H04W 8/22
USPC ....... 455/403, 412.1, 414.1–414.3, 418–420, 455/432.1–433; 370/229, 352, 310; 725/62; 379/201.12; 705/80, 304
See application file for complete search history.

(56) References Cited

U.S. PATENT DOCUMENTS

| | | | | |
|---|---|---|---|---|
| 6,411,697 | B1 * | 6/2002 | Creamer et al. | 379/201.12 |
| 6,574,464 | B1 * | 6/2003 | Chen | 455/406 |
| 6,603,969 | B1 * | 8/2003 | Vuoristo et al. | 455/433 |
| 2002/0095312 | A1 * | 7/2002 | Wheat | 705/1 |
| 2002/0123360 | A1 * | 9/2002 | Vikman et al. | 455/466 |
| 2005/0025047 | A1 * | 2/2005 | Bodin et al. | 370/229 |
| 2006/0098627 | A1 * | 5/2006 | Karaoguz et al. | 370/352 |

(Continued)

OTHER PUBLICATIONS

3GPP TR 23.806 (V 7.0.0), 3$^{rd}$ Generation Partnership Project; Technical Specification Group Services and System Aspects; Voice Call Continuity between CS and IMS Study (Release 7), Dec. 2005.

(Continued)

*Primary Examiner* — Ronald Eisner
(74) *Attorney, Agent, or Firm* — Mintz Levin Cohn Ferris Glovsky and Popeo, P.C.

(57) ABSTRACT

A mechanism for controlling a call management for a call of a subscriber, in particular a service parameter adjustment, comprises a transmission of a request for adjusting settings of a service provided to a subscriber to a network control element, recognition of setting information for the service from the request, and processing of the setting information for the service. In the processing, a mapping of the recognized setting information for the service to a modification event of a data portion including parameters for the service in question is performed and a modification of the parameters for the service in question is performed by executing the modification event of the data portion obtained by the mapping. In case the data portion is not available, a search may be conducted in order to get access to the parameters for the service in question.

28 Claims, 6 Drawing Sheets

(56) References Cited

U.S. PATENT DOCUMENTS

| | | | |
|---|---|---|---|
| 2006/0229084 A1* | 10/2006 | Noldus et al. | 455/456.1 |
| 2006/0252425 A1* | 11/2006 | Jiang | 455/432.1 |
| 2006/0268838 A1* | 11/2006 | Larsson et al. | 370/352 |
| 2006/0280169 A1* | 12/2006 | Mahdi | 370/352 |
| 2007/0099599 A1* | 5/2007 | Smith et al. | 455/414.1 |
| 2007/0123253 A1* | 5/2007 | Simongini et al. | 455/433 |

OTHER PUBLICATIONS

3GPP TS 24.008 (V 7.1.0), $3^{rd}$ Generation Partnership Project; Technical Specification Group Core Network and Terminals; Mobile radio interface Layer 3 specification; core network protocols; Stage 3 (Release 7), Sep. 2005.

* cited by examiner

CALL MANAGEMENT ADJUSTMENT IN CALL CONTINUITY ARCHITECTURE

BACKGROUND OF THE INVENTION

1. Field of the Invention

The present invention relates to a mechanism usable for controlling a call management for a subscriber call. In particular, the present invention relates to a method of controlling a call management of a subscriber call, a corresponding system, a corresponding network control element and a corresponding computer program product which are usable for a service configuration, such as a supplementary service configuration, within a call continuity environment, e.g. a voice call continuity architecture.

For the purpose of the present invention to be described herein below, it should be noted that

- a communication equipment or subscriber terminal may for example be any device by means of which a user may access a communication network; this implies mobile as well as non-mobile devices and networks, independent of the technology platform on which they are based; only as an example, it is noted that communication equipments operated according to principles standardized by the $3^{rd}$ Generation Partnership Project 3GPP and known for example as UMTS terminals are particularly suitable for being used in connection with the present invention;
- although reference was made herein before to voice call, this exemplifies only a specific example of content; content as used in the present invention is intended to mean also multimedia data of at least one of audio data, video data, image data, text data, and meta data descriptive of attributes of the audio, video, image and/or text data, any combination thereof or even, alternatively or additionally, other data such as, as a further example, program code of an application program to be accessed/downloaded;
- method steps likely to be implemented as software code portions and being run using a processor at one of the entities described herein below are software code independent and can be specified using any known or future developed programming language;
- method steps and/or devices likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices or means can be implemented as individual devices or means, but this does not exclude that they are implemented in a distributed fashion throughout the system, as long as the functionality of the device is preserved.

2. Related Prior Art

In the last years, an increasingly extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standards for telecommunication network and multiple access environments.

In general, the system structure of a communication network is such that one party, e.g. a subscriber's communication equipment, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the communication equipment and is connected via an interface to a corresponding core or backbone network subsystem. The core (or backbone) network subsystem switches the data transmitted via the communication connection to a destination party, such as another communication equipment, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM and the like.

Generally, for properly establishing and handling a communication connection between network elements such as the communication equipment (or subscriber terminal) and another communication equipment or terminal, a database, a server, etc., one or more intermediate network elements such as network control elements, support nodes or service nodes are involved. Network control elements, such as a Mobile Switching Center (MSC) or the like, are responsible for controlling the call establishment, call control, call termination, and the like.

Since more and more communication network systems, such as circuit switched (CS) networks, packet switched (PS) networks, Internet Protocol (IP) based networks, for example IP Multimedia Subsystem (IMS), and the like are established in parallel, the provision of an interconnection between these network systems for enabling the continuation of calls of a subscriber gets an increased relevance. For this purpose, call continuity solutions are developed, which are also called voice call continuity (VCC), by means of which a call, for example a voice call, can be continued even if the subscriber is moving between different communication network systems, such as between cellular (e.g. circuit switched) networks and IP based networks (e.g. Wireless Local Area Network (WLAN), wherein the enablement of routing of the call to the respective proper domain (for example circuit switched domain or IP domain, such as an IMS domain) is to be ensured.

In 3GPP, the usage of Voice Call Continuity (VCC) is under investigation. There are prepared mechanisms and corresponding specifications for enabling the routing of a voice call to a proper domain (CS or IMS), a handover between domains (CS and IMS) as well as supplementary service end-user-experience when a subscriber uses either of these domains.

In the specification 3GPP TR 23.806 (V 7.0.0) there are proposed different architectural models in order to fulfil the requirements for providing the VCC function. One of these models is the so called IMS controlled static model where all calls are routed via the IMS domain in order to anchor the connection for a possible handover scenario.

An example for a system structure involving a VCC architecture is shown in FIG. 4. As shown in FIG. 4, one alternative for the VCC between, for example, a circuit switched network domain and an IMS network domain is to route all calls via a Media Gateway Control Function (MGCF) and an IMS-Media Gateway (MGW). This alternative is presented in the specification 3GPP TR 23.806 (V 7.0.0). In FIG. 4 reference sign 1 denotes a dual mode user equipment which is able to communicate with different networks, such as cellular circuit switched networks and IP based networks like an IMS; reference sign 2 denotes an access network subsystem for a circuit switched network domain 20, for example a GSM EDGE (Enhanced Data Rates for GSM) radio access network (GERAN) and/or UMTS radio access network (UTRAN), providing access for a connection of the subscriber to the CS network domain 20; reference sign 3 denotes a MSC for controlling communication connections in the CS network 20; reference sign 4 denotes a Gateway-MSC (GMSC) which provides a connection to other networks, such as a Public Switched Telecommunication Network (PSTN) 40. Reference sign 5 denotes a gsmSCF (GSM-Service Control Function) defining the IN (Intelligent Network) control environment for a mobile network such as the CS network 20, wherein the gsmSCF is adapted to enable an interworking with GSM/GPRS systems. On the other hand, in FIG. 4, reference sign 6 denotes an IP Connectivity Access Network (IP CAN) defining an access network connecting an IMS subscriber to IMS services, i.e. to an IMS network domain 30; reference sign 7 denotes a Call State Control Function (CSCF) of the IMS for processing signalling and performing session control in the IMS network 30, which may comprise a Proxy-CSCF, an Interrogating-CSCF and/or a Serving-CSCF; reference sign 8 denotes a Call Continuity Control Function (CCCF) for providing functions for call continuity between the GSM/UMTS circuit switched domain and IMS domain using an IP CAN; reference sign 9 denotes a Media Gateway Control Function (MGCF) being a central node of a PSTN/CS gateway and converting protocols; reference sign 10 denotes a Media Gateway providing an interface for the media plane of the PSTN 40 or the CS network 20; reference sign 11 denotes a Home Subscriber Server (HSS) providing database functions that are required in network, such as HLR (Home Location Register) functions, DNS (Domain Name Servers) functions, and security and network access databases; reference sign 12 denotes a Network Domain Selection (NeDS) representing a control point for selecting which domain to use for terminating a call. The control plane interconnections between the various network elements according to FIG. 4 are illustrated by solid lines while the user plane interconnections, such as speech path, for a respective communication connection are illustrated by dashed lines. The general functions and the processing of a call in such a network system is known to those skilled in the art so that further detailed explanations are omitted herein.

With regard to the VCC functionality in the architecture according to FIG. 4, the main network elements specific for this continuity function are the dual mode UE 1, the CCCF 8 and the NeDS 12. All VCC transitions (i.e. initial and subsequent) associated with a particular user session are executed and controlled by the CCCF 8 upon UE's request.

The CCCF 8 provides in particular the following functions for call continuity: reception and processing of call continuity requests caused by radio related events, e.g. availability or loss of radio coverage, and establishment, catenation and release of call legs needed to transfer a voice call from CS domain to IMS domain, or visa versa. The NeDS 12 functions as the control point for selecting which domain is to be used for terminating a call. Normally it may be expected that a CS terminating call will terminate on the CS side of a multi-mode terminal, and an IMS terminating call will terminate on the IMS side of a multi-mode terminal. However, there are situations where the selection of the other domain is appropriate (e.g. in the case of a CS terminating call when the terminal is not CS-attached, but is IMS registered). In addition to technical considerations, user preferences and service availability considerations may be considered and are implemented in the NeDS function. The NeDS function is specified by the following:

The NeDS function is aware of whether the terminal is registered on IMS from a device that is Multimedia telephony (with IMS voice) capable, and on an access that is capable to support IMS voice;

The NeDS function is aware of whether the terminal is attached to the CS domain.

The NeDS function is aware of or can obtain the ongoing voice call in the IMS and the CS domain.

The NeDS function controls the decision as to the appropriate terminating domain, taking into account the operator, user and service preferences.

Based on the architecture according to FIG. 4, there has been developed a further alternative for a network architecture involving VCC wherein a so called Access Gateway Control Function (AGCF) is introduced and associated into a (visited) MSC for subscribers having the capability to move between IMS and CS domain. This kind of architecture is shown in FIG. 5.

In FIG. 5, the network elements being equivalent to those shown in FIG. 4 are denoted by the same reference signs, and a further definition thereof is omitted. In addition to these network elements, there are illustrated in FIG. 5 additional access networks including a Unlicensed Mobile Access Network (UMAN) 21 and an Industrial Wireless Local Area Network (I-WLAN) 22 comprising an Wi-Fi interoperability portion 23, by means of which a subscriber terminal (not shown) may access the network. The UMAN is connectable to the MSC 3 (CS network) by means of, for example, a air interface. It is to be noted that the MSC 3 may also comprise a MSC server (MSS). The I-WLAN 23/Wi-Fi 23 is connectable to the IP CAN 6 by using, for example, a Session Initiation Protocol (SIP) based connection. Furthermore, as shown in FIG. 5, there are provided several CSCFs for different function, i.e. a Proxy-CSCF (P-CSCF) 33 for connection to the IP CAN 6, a P-CSCF 32 for connection to the CS network, and a Serving CSCF (S-CSCF) 34 with which the P-CSCFs 32, 33 are connected. The connection type to and from the P-CSCFs 32, 33 and to the S-CSCF 34 are SIP based connections, for example. Furthermore, in the IMS domain, so-called Application Servers (AS) 35 are provided (only one is shown in FIG. 5) which are SIP entities that host and execute services. For example, in the presented case, the AS 35 is both responsible of voice call continuity functions as well as supplementary services. The S-CSCF 34 and the AS 35 are connected via an IP multimedia subsystem Service Control Interface (ISC) based on SIP. It is to be noted that the same interface type ISC/SIP is used for connecting the S-CSCF 34 and the CCCF 8. Furthermore, the S-CSCF 34 is connected to the HSS 11 by means of a Cs/Dx interface. On the other hand, as indicated before, the MSC 3 on the CS network side is associated with the AGCF 31 being connectable to the P-CSCF 32 via a SIP based connection.

It is to be noted that even though in FIG. 5 the AGCF 31 is shown as being associated with the MSC, the ACGF may be combined with the P-CSCF in one entity. In such a case, there would be a communication between the MSC and the ACGF/P-CSCF entity. Which structure is chosen is to be decided by the network provider. As a further alternative, the AGCF may also be provided as a single external element with corresponding connections to the network, such as to MSC and/or P-CSCF.

In the structure shown in FIG. 5, the main elements to be considered for the voice call continuity function are the CCCF 8, as described in FIG. 4, and the AGCF 31 (irrespective of whether the AGCF is comprised in MSC, P-CSCF or provided as separate external element). The AGCF 31 may be configured to actually representing a 3GPP-compliant SIP User Agent (UA) towards IMS. Furthermore, the AGCF may behave as a user equipment towards the IMS network for calls connected via the CS domain. It may perform registration and session establishments as defined, for example, by the 3GPP TS 23.806 (V 7.0.0). When the subscriber makes a location update to the CS domain (i.e. to the visited MSC 3), then the AGCF 31 initiates a 3GPP defined SIP registration towards the S-CSCF 34 located in IMS via the connection through the P-CSCF 32. Eventually when calls are made by a subscriber having a VCC compliant phone and represented by the AGCF 31 towards the IMS as a 3GPP compliant SIP UA, then those calls can be routed directly from the AGCF 31 into the IMS domain as voice over IP (VOIP) calls. Similarly in this architecture calls terminating to a particular subscriber are routed via the IMS domain to the AGCF 31. On the other hand, in case the subscriber terminal is not VCC capable, the call is routed to the PSTN (or PLMN (Public Land Mobile Network)) 40.

In current 3GPP specifications (e.g. Release 5 or 6), it is not defined how voice call related supplementary services are defined. Therefore, it is started to specify, for example in TISPAN (Telecoms & Internet converged Service & Protocols for Advanced Networks), how an IMS architecture is to be changed in order to support supplementary services as those existing today within fixed or mobile CS networks. In detail, it is in particular investigated how a service will work in overall within IMS and by using SIP.

As one item, it is to be defined how a subscriber's terminals using extendible Mark-up Language (XML) can modify settings for supplementary services based thereon. Preferably, all supplementary services such as Call Forwarding services have an own individual set of parameters such as state (active, inactive, etc.) of individual call forwarding service, address of forwarded-to-subscriber (in Universal Resource Identifier, URI) etc. In this connection, one possible way is that the functionality of service will follow the way in which the services are implemented presently within CS networks, which is known to those skilled in the art and therefore not explained in detail herein.

However, the problem is in which way a subscriber is able to modify XML documents that exists within the network. There exists a so-called XCAP (XML Configuration Access Protocol) mechanism which is used to transfer XML documents over HTTP/TCP/IP between terminal endpoints and server(s) located within the core network. This is illustrated in FIG. 6. A corresponding mechanism is applied, for example, for OMA (Open Mobile Alliance) Push-to-Talk within 3GPP to modify group list. When a subscriber terminal 70 uses a XCAP connectivity towards the core network, it will indicate the particular document it will modify. In addition to this, the terminal will also indicate which particular element within the XML document will be modified and with what content. According to FIG. 6, the subscriber terminal sends a corresponding indication to a XML document storage server 71 located in the core network, in which the modification of the XML document takes place. The indication is sent, for example, by means of a Active_CFU (Call Forwarding Unconditional) message including a C-number. After the notification, the XML document storage server 71 initiates a notification about the modification via a SIP connection to a respective application server 72 which is interested of the information, for example a application server providing the respective service. It is to be noted that the XCAP interface is also called Ut-interface in 3GPP IMS specifications (e.g. in connection with conferencing or OMA PoC (Push to talk over Cellular applications).

However, in network system providing a call continuity function, in particular a VCC architecture, an end user is not able to modify data portions, such as XML documents, representing the service if there is no IP-layer connectivity between end user terminal and the server that holds the documents. In particular, in case the terminal is not supporting the XCAP but still uses supplementary service functionalities as defined by TISPAN, when for example the IMS controlled model is used and calls are routed via IMS and application servers (both responsible of voice call continuity as well as supplementary services), the user has no access to a service configuration or call management or the like.

SUMMARY OF THE INVENTION

Thus, it is an object of the invention to provide an improved mechanism for controlling a call management for a call of a subscriber by means of which it is possible to adjust the configuration of services, such as supplementary services, in case there is a limited connectivity provided between the subscriber terminal and the network. Additionally, it is an object of the present invention to provide an improved mechanism for end users having a limited or no capability to directly modify service settings within the network.

This object is achieved by the measures defined in the attached claims.

In particular, according to one aspect of the proposed solution, there is provided, for example, a method of controlling a call management for a call of a subscriber, the method comprising steps of transmitting a request for adjusting settings of a service provided to a subscriber to a network control element, recognizing setting information for the service from the request, and processing the setting information for the service, wherein the processing step comprises mapping the recognized setting information for the service to a modification event of a data portion including parameters for the service in question, and performing a modification of the parameters for the service in question by executing the modification event of the data portion obtained by the mapping.

Furthermore, according to one aspect of the proposed solution, there is provided, for example, a system for controlling a call management for a call of a subscriber, the system comprising a subscriber terminal operationally connected to and configured to conduct a call, and a network control element operationally connected to and configured to control a call of the subscriber terminal, wherein the subscriber terminal is configured to send a request for adjusting settings of a service provided to a subscriber to the network control element, and the network control element is configured to recognize setting information for the service from the request received, and to process the setting information for the service, wherein the network control element is further configured to perform a mapping of the recognized setting information for the service to a modification event of a data portion including parameters for the service in question, and to perform a modification of the parameters for the service in question by executing the modification event of the data portion obtained by the mapping.

Similarly, according to one aspect of the proposed solution, there is provided, for example, a system for controlling a call management for a call of a subscriber, the system comprising a subscriber terminal comprising means for producing a request for adjusting settings of a service provided to a subscriber and means for sending the request, and a network control element comprising a receiver for receiving the request, and a processor for recognizing setting information for the service from the request, and for processing the setting information for the service, wherein the processor comprises means for mapping the recognized setting information for the service to a modification event of a data portion including parameters for the service in question, and means for performing a modification of the parameters for the service in question by executing the modification event of the data portion obtained by the mapping.

Moreover, according to one aspect of the proposed solution, there is provided, for example, a network control element for controlling a call of a subscriber and usable in a call management adjustment, wherein the network control element is operationally connected to and configured to receive a request for adjusting settings of a service provided to a subscriber from a subscriber terminal, to recognize setting information for the service from the request received, and to process the setting information for the service, wherein the network control element is further configured to perform a mapping of the recognized setting information for the service to a modification event of a data portion including parameters for the service in question, and to perform a modification of the parameters for the service in question by executing the modification event of the data portion obtained by the mapping.

Similarly, according to one aspect of the proposed solution, there is provided, for example, a network control element for controlling a call of a subscriber and usable in a call management adjustment, wherein the network control element comprises a receiver for receiving a request for adjusting settings of a service provided to a subscriber from a subscriber terminal, and a processor for recognizing setting information for the service from the request received, and for processing the setting information for the service, wherein the network control element further comprises means for performing a mapping of the recognized setting information for the service to a modification event of a data portion including parameters for the service in question, and means for performing a modification of the parameters for the service in question by executing the modification event of the data portion obtained by the mapping.

In addition, according to one aspect of the proposed solution, there is provided, for example, computer program product for a computer, comprising software code portions for making, when said product is run on the computer, said computer to function as a control element usable for controlling a call management for a subscriber, wherein the computer program product is configured to execute steps of receiving a request for adjusting settings of a service provided to a subscriber from a subscriber terminal, recognizing setting information for the service from the request received, and processing the setting information for the service, wherein the computer program product is further configured to execute steps of performing a mapping of the recognized setting information for the service to a modification event of a data portion including parameters for the service in question, and performing a modification of the parameters for the service in question by executing the modification event of the data portion obtained by the mapping.

According to further refinements, the proposed solution may comprise one or more of the following features:

- it may be determined whether or not the subscriber is entitled to the service, wherein the processing of the setting information is executed when it is determined that the subscriber is entitled to the service;
- it may be searched for the data portion including parameters for the service within databases, and it may be accessed to at least one specific parameter included in the data portion and to be modified according to the setting information;
- the modification may comprise an uploading of a modified data portion obtained by executing the modification event into a database;
- an application server associated with the service provided to the subscriber may be informed about the modification of the data portion when the modification is completed;
- an entity of a network may be used as a storage for the data portion, wherein the entity may be a separate network element or an entity associated with the network control element;
- the network control element may comprise a mobile switching center of a visited communication network, the mobile switching center including a gateway control function and a mapping function used for the mapping of the recognized setting information for the service to the modification event of the data portion;
- for transmitting the request for adjusting settings of the service provided to the subscriber, one of an unstructured supplementary service data string and a facility information element may be comprised in the request as the setting information;
- the data portion may be comprised in an extensible mark-up language document.

By virtue of the proposed solutions, the following advantages can be achieved. It is possible to combine together both call continuity function and services of different networks, such as voice call continuity and IMS-based voice related supplementary services, in a way that it is possible for an operator to route all calls by a similar way (to the IMS) and not just VCC enabled terminals. This enables the operator to provide supplementary services for both VCC and non-VCC subscribers, as defined for example by TISPAN, from an IMS application server without requiring that the subscriber terminal must to support XML/XCAP connection in order to manage, for example, supplementary services. It is possible to configure or adjust IMS provided supplementary services (having configuration information based on data portions, such as XML documents) by using a mechanism which is easy to implement since only a limited number of network nodes must be equipped correspondingly. In particular, the present invention enables, for example, to convert service adjustment commands, such as supplementary service activation commands specified in the 3GPP specification TS 24.008 (V 7.1.0), into corresponding data portions, such as XML documents, which improves the call management with regard to a call continuity function. Moreover, it is possible that a subscriber having a terminal without direct capability to modify service settings within the network is able to modify these settings via the functionality defined in the invention. For example, a traditional CS GSM terminal is enabled to modify service-specific information located in XML documents in an appropriate database, e.g. ETSI TISPAN specified supplementary service configuration settings (stored in XML documents) that are located within a database storage, while conventionally a configuration of the XML documents without supports at handset would not be possible.

The above and still further objects, features and advantages of the invention will become more apparent upon referring to the description and the accompanying drawings.

DESCRIPTION OF PREFERRED EMBODIMENTS

Figure 1:
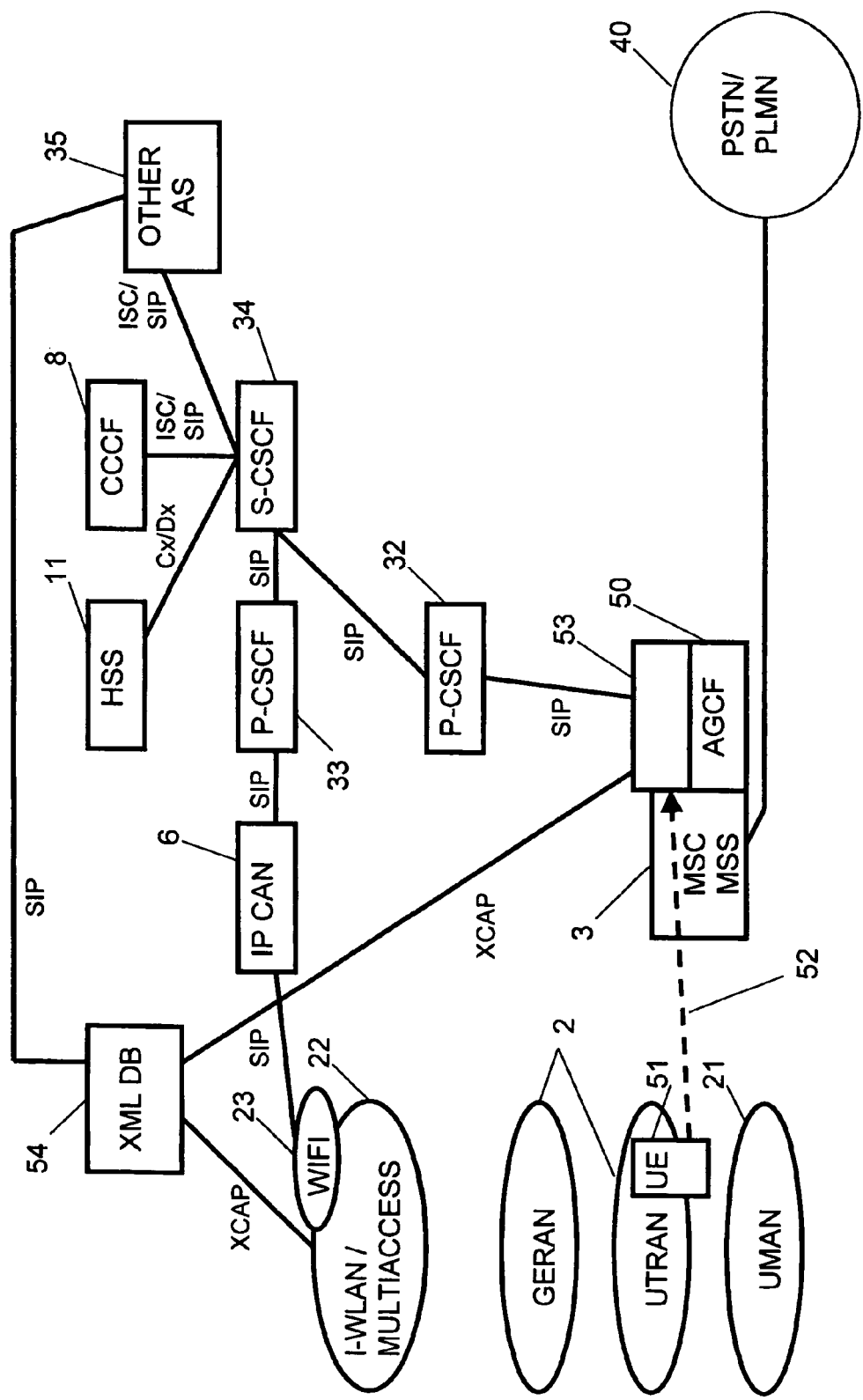
FIG. 1 shows a diagram of a simplified structure of a network environment in which an embodiment of the present invention is applicable.

In the following, embodiments of the present invention are described with reference to the drawings. For illustrating the present invention, the preferred embodiments will be described in a 3G network environment comprising mobile access network subsystem and core network subsystem components according to the 3GPP specifications, as well as in a IMS network environment. However, it is to be noted that the present invention is not limited to an application in such a network environments but is also generally applicable in other network types. In FIG. 1, a schematic block diagram of a basic network environment of a communication network is shown. It is to be noted that the structure according to FIG. 1 represents only a simplified example of an architecture of a communication network environment in which the present invention is applicable. As known by those skilled in the art, there are provided several additional network elements and signaling links used for a communication connection. However, for the sake of simplicity, only those elements are depicted which are necessary for describing the invention.

Furthermore, the network elements and their functions described herein may be implemented by software, e.g. by a computer program product for a computer, or by hardware. In any case, for executing their respective functions, correspondingly used devices, such as a communication equipment, core network control element like a mobile switching centre MSC and associated functions, an access network subsystem element like Radio Access Network RAN element and the like, comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like. Similar to that, the second network environment, i.e. the IMS domain, may comprise several elements and/or functionalities not shown which are known, however, to a person skilled in the art and therefore not described in greater detail herein.

Figure 5:
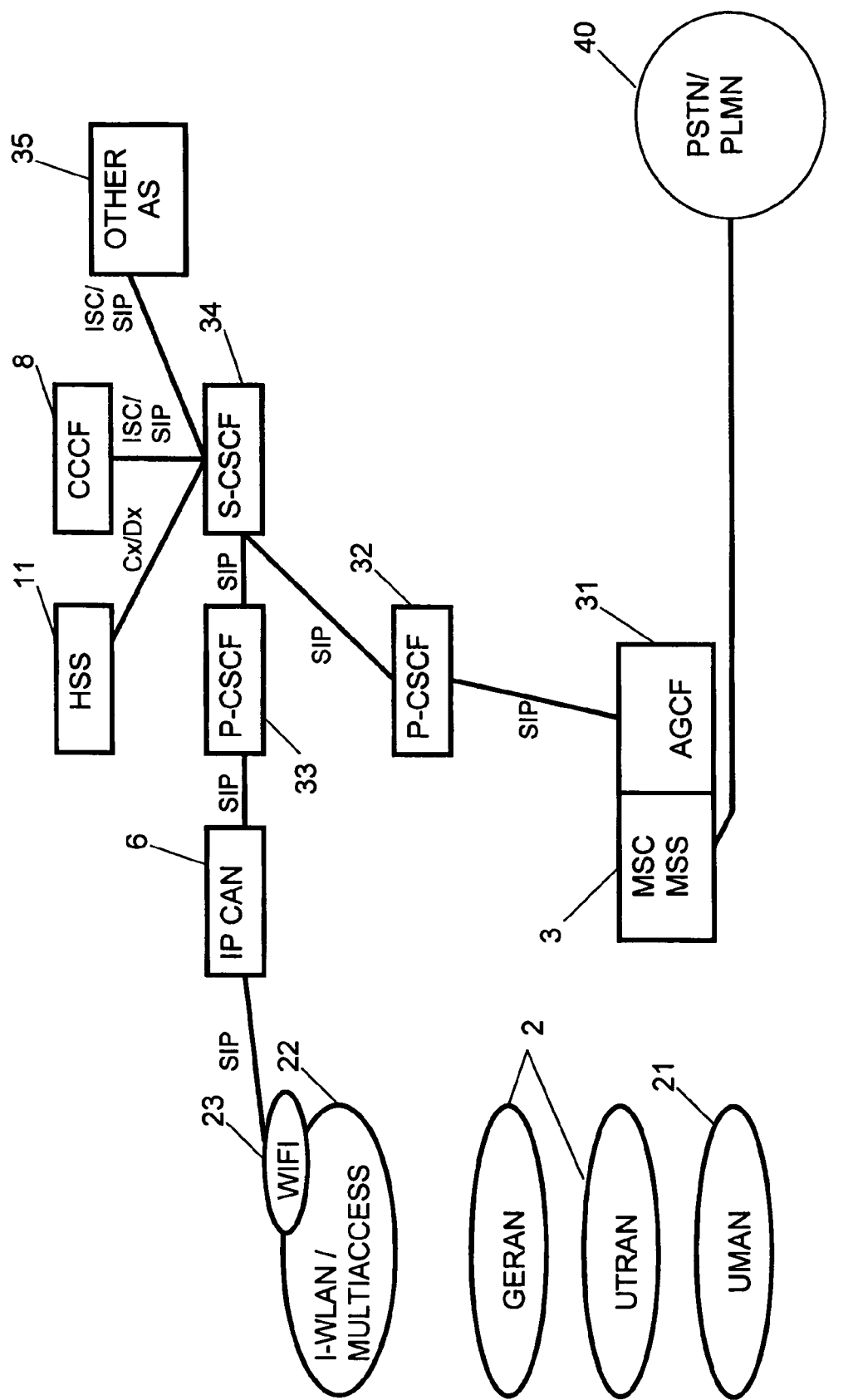
Figure 6:
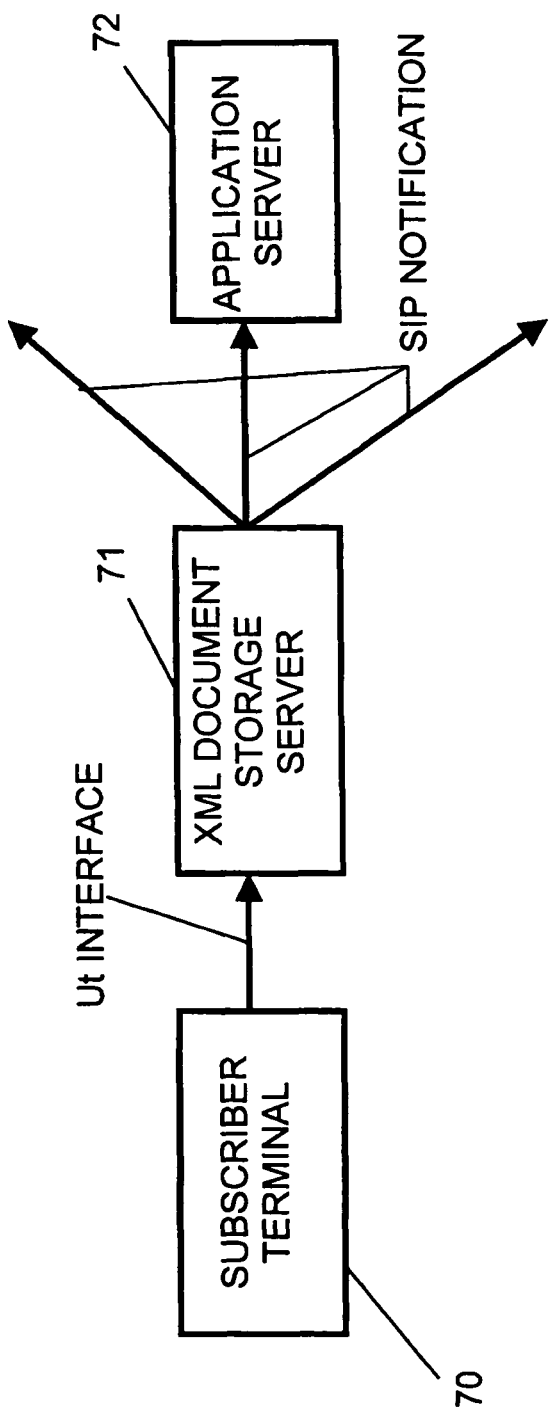
FIG. 6 shows a diagram illustrating a conventional mechanism for modifying XML documents.

The network architecture shown in FIG. 1 is based on that described in FIG. 5, wherein equivalent elements are denoted with the same reference signs. The network structure according to FIG. 1 is connectable with different access networks, which comprises, for example, UTRAN, GERAN 2, UMAN 21, I-WLAN with Wi-Fi 23, and may comprise also other, not shown access networks. On the IMS domain side, an IP CAN 6, P-CSCFs 32, 33, a S-CSCF 34, a HSS 11, a CCCF 8 and application servers 35 are provided. On the CS domain side, a MSC/MSS 3 is provided which provides a connection to the PSTN//PLMN 40. The connections and links between these elements correspond to those described in FIG. 5 above.

Furthermore, according to the present embodiment, a database 54 for storing information, in particular service related information for services provided to a subscriber, is provided in the network architecture, for example, in the IMS domain side. The database 54 is, for example, a XML DB in which XML documents are stored. The XML DB is connected to the I-WLAN by means of an XCAP interface in order to provide an access for subscriber terminals or the like which are capable of using XCAP mechanism. In addition, the XML DB is connected to application servers where services related to the information stored in the database are processed. The XML DB could be, for example, a XML Document Management System (XDMS) according to 3GPP OMA XCAP specifications.

On the other hand, at the MSC/MSS 3 part, there is provided an AGCF 50 which may comprise basically the same configuration and functionality like the AGCF 31 of FIG. 5. This means that the AGCF 50 may be associated with the MSC, the ACGF may have integrated a P-CSCF, or the AGCF may also be provided as a single external element with corresponding connections to the network, such as to MSC and/or P-CSCF. According to the present embodiment, the AGCF 50 is further associated with a mapper functionality indicated with reference sign 53. The mapper functionality 53 may be located in the AGCF 53 and is configured to convert a functionional protocol (e.g. a codec according to 3GPP TS 24.008) to data portion updates for data portions stored in the database 54, and vice versa. In the present case, the mapper functionality is configured to map, for example, supplementary service commands to XCAP/XML document updates, and vice versa. This will be described below. In the example of FIG. 1, where the AGCF 50 is associated with the MSC, the AGCF 50 with the mapper functionality 53 is connected via a SIP based connection with the P-CSCF 32 and via a XCAP interface to the XML DB 54. Of course, if the AGCF and P-CSCF functions are integrated in one entity, this is not necessary. The AGCF 50 is implemented according to the present embodiment into the MSC Server together with XCAP interface in order to modify service specific data used by supplementary service application servers (AS 35) and local storage for XML documents. Furthermore, the AGCF 50 represents a 3GPP SIP User Agent towards the IMS core network in order to execute registration as well as authentication towards the IMS. The AGCF 50 makes either dynamic or pre-configured mapping between private identity used in CS side (IMSI/TMSI) and the identity used in IMS (IMS Private Identifier, IMPI) in order to achieve successful registration towards IMS.

Furthermore, FIG. 1 shows a subscriber terminal or user equipment (UE) 51 located, for example, in the UTRAN 2 coverage area. It is to be noted that the UE 51 is not provided with XCAP mechanism for adjusting the contents of the XML DB 54. Instead, as indicated by an arrow 52, adjustment commands are transmitted to the MSC/MSS 3 and the AGCF 50.

The service configuration according to the present invention in the network structure according to FIG. 1 is described below.

After the subscriber (UE 51) starts to configure a service provided to him, for example he starts to activate a Call Forwarding Unconditional (CFU) supplementary service to a certain forwarded-to number, a corresponding command is send from the UE 51 to the MSC 3 by means of the message 52. This message 52 may comprise, for example, a supplementary service act/int/deact based on 3GPP specifications, but is not limited thereto. Then, the AGCF 50 with the mapper functionality 53 executes modifications to locally stored XML document according information that has been received, for example, from a facility information element or alternatively from a USSD-string (Unstructured Supplementary Service Data). In case the XML document is not locally cached within AGCF 50, then it is possible that either the subscriber does not have this service active or it has not yet been cached within this particular node. In the latter case, it is either possible to reject the request or to start searching for the XML document in the core network (e.g. databases) on the basis of the information received. It is also possible that no caching is done wherein the AGCF 50 initiates fetching of the information every time it needs to modify the service information, i.e. a corresponding command is received, for example. In any case, the AGCF 50 is configured to inspect whether the subscriber is entitled to use the service (in TISPAN). If the subscriber is not entitled, then a reject of the request by using appropriate means is executed.

When the AGCF 50 is co-located within the visited MSC 3, as shown in FIG. 1, and a voice call continuity function is present, then according to the present embodiment a mapping between the functional protocol or USSD-string received from the subscriber terminal UE 51 to a modification event of subscriber's service specific XML document is implemented. An more detailed example of this is described in the following. The user types, for example, "*21*C-number#" from his/her terminal user interface, in order to activate Call Forwarding Unconditional, or selects the command from a menu of user interface. In both cases typically GSM terminals will convert this into an appropriate (ASN.1/BER encoded) Call Forwarding Unconditional service modification request and send a corresponding FACILITY-message (52) towards the visited MSC or MSC Server 3 of the subscriber. The visited MSC or MSC Server 3 executes, on the basis of instructions and conversion tables stored in the mapping functionality 53, for example, a modification of service data or parameters towards a Visited Location Register VLR and a Home Location Register HLR (not shown). The modification is preferably executed when it is checked and confirmed that the subscriber is entitled to use the particular service. Further preferable, as a response to the subscriber terminal 51, the visited MSC/MSC Server 3 replies with either a positive or a negative acknowledge message, which will then result in an appropriate indication to the user interface/screen (not shown) of end user's terminal 51.

It is to be noted that according to the present embodiment the service related information (i.e. the XML documents describing parameters for the service in question, is maintained in individual XML document server 54, which can be used to hold also other XML documents as well used for other services (for example PoC).

According to the present embodiment, the AGCF 50 with the mapper functionality 53 that is located within the visited MSC/MSC Server 3 is configured to have the following properties in order to be able to modify service specific XML documents via the XCAP interface in the XML DB 54:

- The AGCF 50 is able to find the appropriate XML document within the core network (i.e. it recognizes from the request sent by the UE 51 what is the URI leading to the correct XML document and what is (are) the element(s) within that document to be modified). This can be executed, for example, by appropriate search mechanisms. The AGCF 50 has also the capability to access to the corresponding XML document and the element(s) when they are found.
- The AGCF 50 has the capability to subscribe by using SIP into a specific event package representing the XML document in order to get information related to the subscription information (e.g. when operator modifies the service data).
- Furthermore, the ACGF has the capability to map received the content of the request, for example supplementary service activation, interrogation and deactivation requests, received from the subscriber terminal as defined in CS mobile network specifications into appropriate XML document modification events and the capability to upload this modification event via the XCAP interface into the document database 54.

Preferably, when the subscriber is using one particular service from IMS by using an IMS controlled model, then this same service is not used from the CS side. Example is that if call_forwarding_not_reply is provided from the IMS, then that is not provided by the visited MSC/MSC Servers within CS network. However depending on the AGCF's architecture, it could use probably enhanced VLR database located at same physical visited MSC/MSC Server network element (MSC/MSS 3) to hold supplementary service data regardless of the location of the service execution. Naturally the AGCF 50 may also have an own database that is separate from VLR data if combined VLR database for both visited MSC/MSC Server and AGCF side is problematic for any reason.

When the modification is execute, i.e. the modified XML document is uploaded to the XML DB 54, then the application server functionality (AS 35) that executes the actual service logic will be informed about the changes of the appropriate XML documents related to the specific services. This informing is done, for example, by using a SIP subscription mechanisms. When the AGCF 50 has modified the XML document, then the server that holds the edited XML document will send SIP notification to the application servers that have subscribed as watchers for events occurring to that particular document. In this way, e.g. when the subscriber receives a new call from the network, the application server 35 is able to take new modifications (in XML document) into account.

Figure 2:
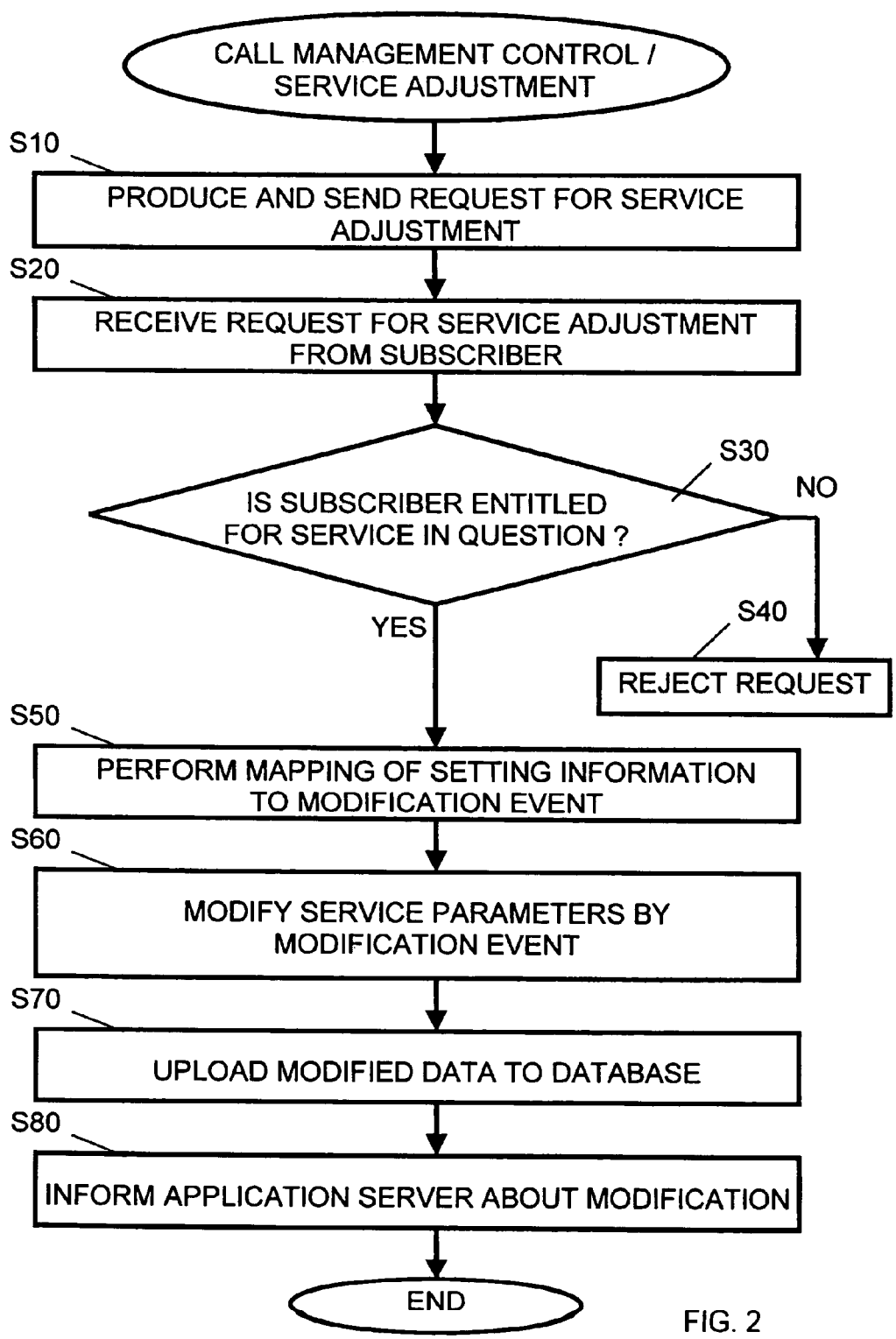
FIG. 2 shows a flow chart illustrating a call management control/service adjustment procedure according to an embodiment of the present invention.

In FIG. 2, a flow chart for illustrating the call management control/service adjustment procedure to be executed in a network environment involving a call continuity function is described. When the service adjustment procedure is to be started, the subscriber terminal produces a request related to the service adjustment and sends it to the MSC/MSS 3 of the CS network domain. The MSC/MSS 3 receives the request and processes it for recognizing the service to be modified, for example a supplementary service (step S20). Then, in step S30, it is checked by the MSC/MSS 3 whether or not the subscriber is entitled for the service in question. If this is not the case (NO in step S30), the request is rejected (step S40) and the subscriber is informed accordingly.

On the other hand, if the decision in step S30 is YES (i.e. the subscriber is entitled for the service in question), the MSC/MSS 3 begins in step S50 by means of the mapping functionality 53 in the AGCF 50 to perform a mapping of recognized setting information for the service in question to a modification event of a data portion including the parameters for the service. In this connection, it is to be noted that a further step (not shown) may be necessary in order to search for and access to the corresponding data portion (XML document) and parameters in the core network.

When the mapping is completed in step S50, the service parameters are modified in step S60 by changing the data portion elements (XML document elements) in accordance with the modification event (e.g. by overwriting the corresponding parts of the data portion with the newly retrieved elements). Then, in step S70, the modified data portion is uploaded to a predetermined database, for example database 54, via a suitable interface (for example XCAP). When the upload is completed and the modification is completed, the application server responsible for the service in question is informed about the modification (step S80) in order to ensure that the modification takes place for a call directed to the subscriber. Thereafter, the procedure ends.

Figure 3:
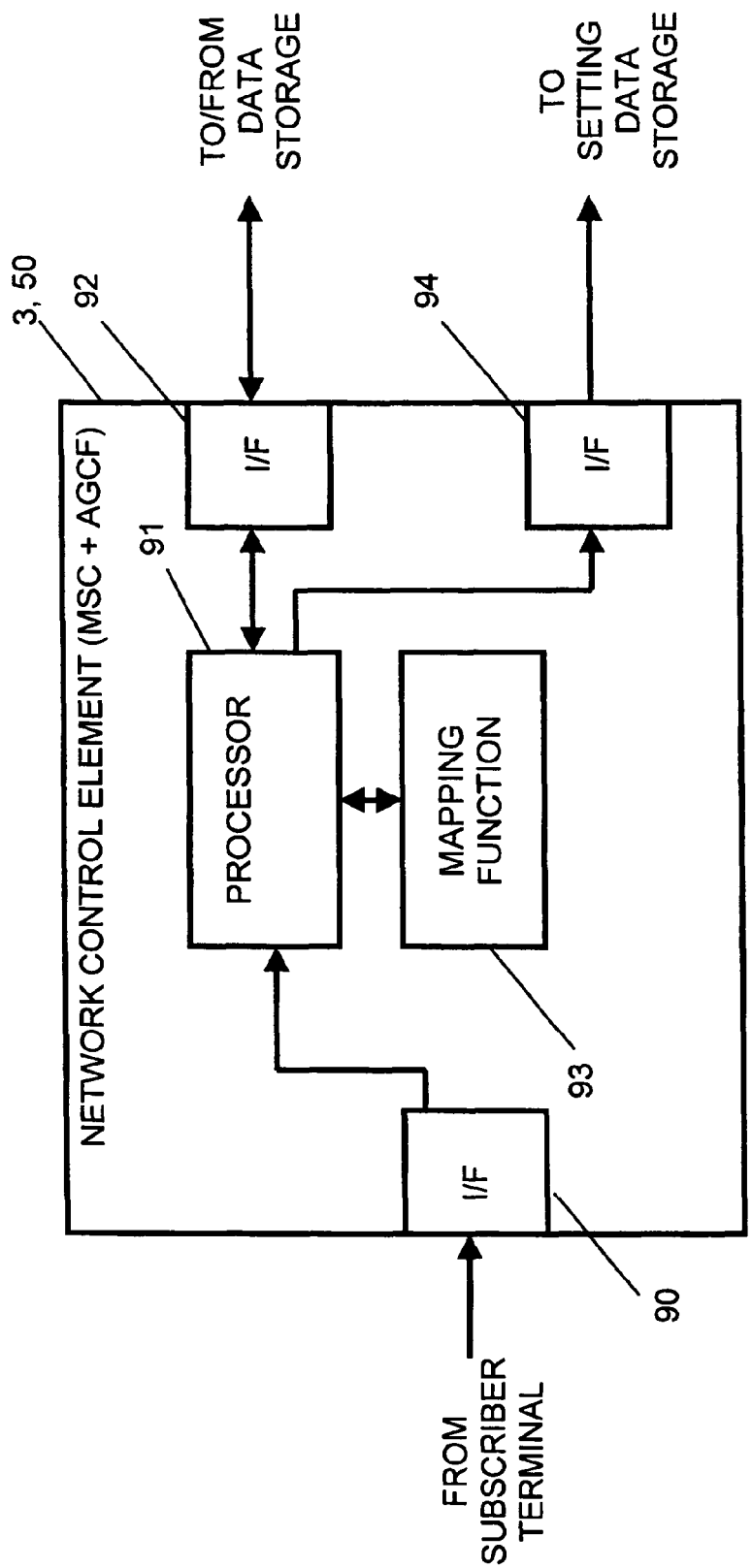
FIG. 3 shows a block circuit diagram of a network control element according to an embodiment of the present invention.
Figure 4:
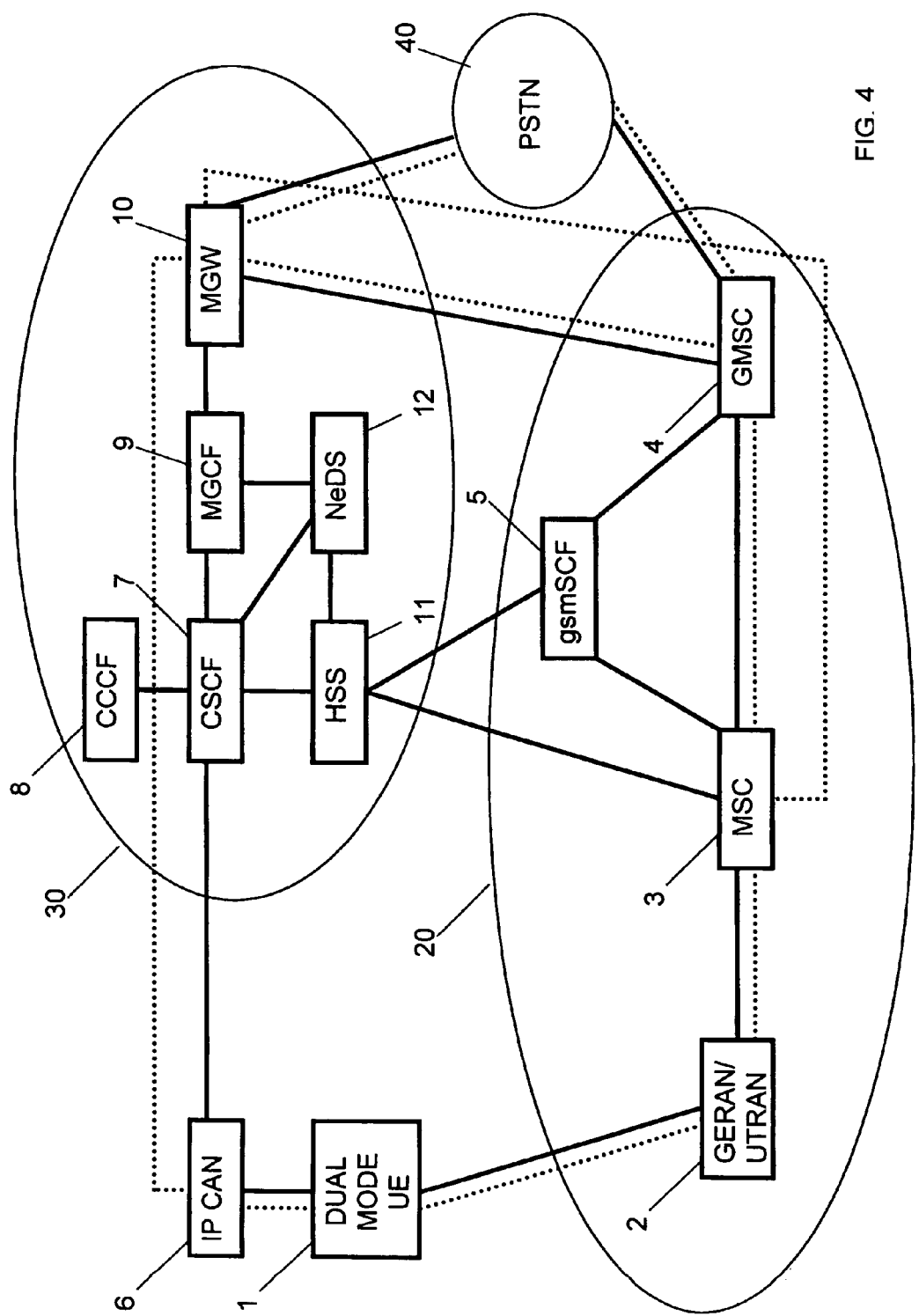
FIG. 4 shows a diagram illustrating a voice call continuity architecture according to a conventional example, FIG. 5 diagram of a simplified structure of a network environment including an enhanced voice call continuity architecture according to a conventional example.

In FIG. 3, a block circuit diagram showing a more detailed structure of a network control element according to the embodiment of the present invention is illustrated. The network control element comprising the MSC/MSS 3 and the AGCF 50 as shown in FIG. 1 is provided with interface means (I/F) 90 for a connection to the subscriber terminal (i.e. to the access networks), I/F 92 for a connection to a data storage, such as the database 54, via an XCAP connection, and a I/F 94 for a connection to a setting data storage. The setting data storage can be the same entity as the data storage connected to I/F 92. Furthermore, as indicated above, the data storages may be located in the network control element itself.

Furthermore, a processor 91 is provided which is connected to the I/Fs 90, 92 and 94. The processor 91 is configured to process data received from the I/Fs 90, 92, 94 (e.g. commands and setting information included in a request from the subscriber, data portions (XML documents) from a data storage and the like) and to perform a modification of a data portion in accordance with the setting information received. For this purpose, a mapping function 93 is provided which is connected to the processor 91 and configured to execute the mapping of the setting information to a modification event so as to convert the data portion into a new one corresponding to the request of the subscriber.

Furthermore, after the modification is completed, the processor is configured to upload the modified data portion to the setting data storage.

It is to be noted that the information of the application server, after the modification is completed, can be executed by the network control element instead of the database.

Even though this invention targets mainly to handle supplementary service specific XML documents via XCAP interface from an AGCF that is integrated next to a visited MSC/MSC Server, it is possible other use cases for this behaviour. For example, these cases may comprise any service provided to a user which service being adjustable by the user.

As described above, a mechanism for controlling a call management for a call of a subscriber, in particular a service parameter adjustment, comprises a transmission of a request for adjusting settings of a service provided to a subscriber to a network control element, recognition of setting information for the service from the request, and processing of the setting information for the service. In the processing, a mapping of the recognized setting information for the service to a modification event of a data portion including parameters for the service in question is performed and a modification of the parameters for the service in question is performed by executing the modification event of the data portion obtained by the mapping. In case the data portion is not available, a search may be conducted in order to get access to the parameters for the service in question.

It should be understood that the above description and accompanying figures are merely intended to illustrate the present invention by way of example only. The preferred embodiments of the present invention may thus vary within the scope of the attached claims.

The invention claimed is:

1. A method comprising:
   receiving, from a subscriber terminal, a request for adjusting settings of a service provided to a subscriber;
   detecting, from the request, setting information changes for the service; and
   processing the setting information changes for the service, wherein the processing comprises:
   mapping the setting information changes for the service to a modification event of an extensible mark-up language fragment, the extensible mark-up language fragment including parameters for the service, and
   performing a modification of the parameters for the service by executing the modification event of the extensible mark-up language fragment, the modification event obtained by the mapping, wherein at least one of the receiving, the detecting, and the processing is implemented at a network control element, the network control element coupling a circuit switched network to an internet protocol multimedia subsystem, wherein the network control element comprises at least one processor.

2. The method according to claim 1, further comprising: determining whether the subscriber is entitled to the service, wherein the processing of the setting information changes is executed when it is determined that the subscriber is entitled to the service, wherein the network control element comprises a mobile switching center.

3. The method according to claim 1, further comprising: searching for the extensible mark-up language fragment including the parameters for the service within databases, and accessing at least one specific parameter included in the extensible mark-up language fragment that is to be modified according to the setting information changes.

4. The method according to claim 1, wherein the performing the modification comprises uploading a modified extensible mark-up language fragment obtained by executing the modification event into a database.

5. The method according to claim 1, further comprising: informing an application server associated with the service provided to the subscriber about the modification of the extensible mark-up language fragment when the performing the modification is completed.

6. The method according to claim 1, further comprising: using an entity of a network as a storage for the extensible mark-up language fragment, wherein the entity comprises a separate network element or an entity associated with the network control element.

7. The method according to claim 1, wherein the network control element comprises a mobile switching center of a visited communication network, and the mobile switching center comprises a gateway control function and a mapping function for the mapping of the setting information changes for the service to the modification event of the extensible mark-up language fragment.

8. The method according to claim 1, wherein, in the transmitting the request for adjusting settings of the service provided to the subscriber, one of an unstructured supplementary service data string and a facility information element is included in the request as the setting information changes.

9. The method according to claim 1, wherein the extensible mark-up language fragment is retrieved from an extensible mark-up language database based on an identifier obtained from the request.

10. An apparatus comprising at least one processor; and at least one memory including computer program code, the at least one memory and the computer program code configured to, with the at least one processor, cause the apparatus to perform at least the following:
receive, from a subscriber terminal, a request for adjusting settings of a service provided to a subscriber;
detect, from the request, setting information changes for the service;
process the setting information changes for the service;
perform a mapping of the setting information changes for the service to a modification event of an extensible mark-up language fragment, the extensible mark-up language fragment including parameters for the service; and
perform a modification of the parameters for the service by executing the modification event of the extensible mark-up language fragment, the modification event obtained by the mapping, wherein the apparatus couples a circuit switched network to an internet protocol multimedia subsystem.

11. The apparatus according to claim 10, wherein the apparatus is further configured to at least determine whether the subscriber is entitled to the service and process the setting information changes when it is determined that the subscriber is entitled to the service.

12. The apparatus according to claim 10, wherein the apparatus is further configured to at least search for the extensible mark-up language fragment including parameters for the service within database and access at least one specific parameter included in the extensible mark-up language fragment that is to be modified according to the setting information changes.

13. The apparatus according to claim 10, wherein the apparatus is further configured to at least upload a modified extensible mark-up language fragment obtained by executing the modification event into a database when performing the modification.

14. The apparatus according to claim 10, wherein the apparatus is further configured to at least inform an application server associated with the service provided to the subscriber about the modification of the extensible mark-up language fragment when the modification is compeled.

15. The apparatus according to claim 10, wherein the network control element is associated with an entity of a network, the entity being operationally connected to and configured to serve as a storage for the extensible mark-up language fragment.

16. The apparatus according to claim 10, wherein the network control element comprises a mobile switching center of a visited communication network, and the mobile switching center comprises a gateway control function and a mapping function for the mapping of the setting information changes for the service to the modification event of the extensible mark-up language fragment.

17. The apparatus according to claim 10, wherein the apparatus is further configured to at least receive the request for adjusting settings of the service provided to the subscriber as an unstructured supplementary service data string or a facility information element.

18. The apparatus according to claim 10, wherein the extensible mark-up language fragment is retrieved from an extensible mark-up language database based on an identifier obtained from the request received.

19. A non-transitory computer-readable storage medium including code, which when executed by a processor, provides operations comprising:
receiving, from a subscriber terminal, a request for adjusting settings of a service provided to a subscriber;
detecting, from the request, setting information changes for the service;
processing the setting information changes for the service;
mapping of the setting information changes for the service to a modification event of an extensible mark-up language fragment, the extensible mark-up language fragment including parameters for the service; and
performing a modification of the parameters for the service by executing the modification event of the extensible mark-up language fragment, the modification event obtained by the mapping, wherein at least one of the receiving, the detecting, the processing is implemented at a network control element, the network control element coupling a circuit switched network to an internet protocol multimedia subsystem.

20. The non-transitory computer-readable medium according to claim 19, further comprising: determining whether the subscriber is entitled to the service; and processing the setting information changes when it is determined that the subscriber is entitled to the service.

21. The non-transitory computer-readable medium according to claim 19 further comprising: searching for the extensible mark-up language fragment including parameters for the service within databases; and accessing at least one specific parameter included in the extensible mark-up language fragment data portion that is to be modified according to the setting information changes.

22. The non-transitory computer-readable medium according to claim 19 further comprising: uploading a modified extensible mark-up language fragment obtained by executing the modification event into a database when performing the modification.

23. The non-transitory computer-readable medium according to claim 19 further comprising: informing an application server associated with the service provided to the subscriber about the modification of the extensible mark-up language fragment when the modification is completed.

24. The non-transitory computer-readable medium according to claim 19 further comprising: using an entity of a network as a storage for the extensible mark-up language fragment, wherein the entity comprises a separate network element or an entity associated with the control element.

25. The non-transitory computer-readable medium according to claim 19, wherein said computer-readable medium is further configured to provide the network control element included in a mobile switching center of a visited communication network, and a gateway control function, and a mapping function for the mapping of the setting information changes for the service to the modification event of the extensible mark-up language fragment data portion.

26. The non-transitory computer-readable medium according to claim 19, further comprising receiving the request for adjusting settings of the service provided to the subscriber as an unstructured supplementary service data string or a facility information element.

27. The non-transitory computer-readable medium according to claim 19, wherein the extensible mark-up language fragment is retrieved from an extensible mark-up language database based on an identifier obtained from the received request data portion is included in an extensible mark up language document.

28. An apparatus comprising at least one processor; and at least one memory including computer program code, the at least one memory and the computer program code configured to, with the at least one processor, cause the apparatus to perform at least the following:
receive, at a network control element, from a subscriber terminal, a request for adjusting settings of a supplementary service provided to the subscriber terminal;
detect, at the network control element, from the received request, setting information changes for the supplementary service;
determine, at the network control element, based on the request, an identifier of an extensible mark-up language fragment, the extensible mark-up language fragment including parameters for the supplementary service;
obtain, at the network control element and based on the identifier, the extensible mark-up language fragment;
perform a mapping of the setting information changes for the supplementary service to a modification event of the extensible mark-up language fragment; and
perform a modification of the parameters for the supplementary service by executing the modification event of the extensible mark-up language fragment.

\* \* \* \* \*